United States Patent [19]

Shamir

[11] Patent Number: 5,504,817
[45] Date of Patent: Apr. 2, 1996

[54] METHOD AND APPARATUS FOR MEMORY EFFICIENT VARIANTS OF PUBLIC KEY ENCRYPTION AND IDENTIFICATION SCHEMES FOR SMART CARD APPLICATIONS

[75] Inventor: Adi Shamir, Rehovot, Israel

[73] Assignee: Yeda Research and Development Co. Ltd. at the Weizmann Institute of Science, Rehovot, Israel

[21] Appl. No.: 240,016

[22] Filed: May 9, 1994

[51] Int. Cl.⁶ .............................. H04L 9/30; H04L 9/32
[52] U.S. Cl. ........................ 380/30; 380/28; 364/746; 235/380
[58] Field of Search ........................ 380/28, 30; 364/746, 364/746.1; 235/380

[56] References Cited

U.S. PATENT DOCUMENTS

| | | | |
|---|---|---|---|
| 4,658,094 | 4/1987 | Clark | 380/28 |
| 4,748,668 | 5/1988 | Shamir et al. | |
| 4,932,056 | 6/1990 | Shamir | |
| 4,933,970 | 6/1990 | Shamir | |
| 5,121,431 | 6/1992 | Wiener | 380/30 X |
| 5,144,574 | 9/1992 | Morita | 364/746 |
| 5,166,978 | 11/1992 | Quisquater | 380/30 |
| 5,274,707 | 12/1993 | Schlafly | 380/30 |
| 5,289,397 | 2/1994 | Clark et al. | 364/746 |
| 5,313,530 | 5/1994 | Iwamura | 380/30 X |
| 5,349,551 | 9/1994 | Petro | 364/746 |
| 5,373,560 | 12/1994 | Schlafly | 380/30 |
| 5,406,628 | 4/1995 | Beller et al. | 380/30 |
| 5,414,651 | 5/1995 | Kessels | 364/746 |
| 5,414,772 | 5/1995 | Naccach et al. | 380/30 X |

FOREIGN PATENT DOCUMENTS 91402958  11/1991  European Pat. Off.

*Primary Examiner*—Gilberto Barrón, Jr.
*Attorney, Agent, or Firm*—Keck, Mahin & Cate

[57] ABSTRACT

Memory efficient variants of public key encryption and identification schemes for smart card applications with severely limited RAM without using dedicated coprocessors. The variants replace the memory-intensive modular multiplication operation $z=x*y \pmod{n}$ by a new randomized multiplication operation $z'=x*y+r*n$, where $r$ is a randomly chosen integer in a suitable range $[0,b]$, and a double convolution process to compute $z'$ is used. Method and apparatus are described.

8 Claims, 3 Drawing Sheets

METHOD AND APPARATUS FOR MEMORY EFFICIENT VARIANTS OF PUBLIC KEY ENCRYPTION AND IDENTIFICATION SCHEMES FOR SMART CARD APPLICATIONS

FIELD OF THE INVENTION

The invention relates to a method and an apparatus for public key encryption and identification schemes for smart card applications.

BACKGROUND OF THE INVENTION

Almost all the public key encryption and identification schemes proposed so far are based on modular multiplications with a modulus n which is the product of two secret primes p and q. To make the factorization of n difficult, it is necessary to use very large numbers. The minimum recommended size of n is currently 512 bits, but due to the explosive growth of computing power available to cryptanalysts, this minimum size is likely to increase to 1024 bits (and to even larger values for high security applications).

In many communication and access control applications, it is desirable to use smart cards to carry out sensitive computations. Among the many reasons for this choice are the small physical size, the portability, the non-volatile memory, and the security offered by a single chip computer embedded in a plastic card. Millions of smart cards are used each year to make bank cards more secure, to control access to pay-TV, to carry billing information in cellular telephones, etc.

The biggest limitation in today's smart cards is the small amount of random access memory (RAM) available in the card. The most popular smart card chip made by Motorola has 36 bytes of RAM, and the most popular smart card chip made by Thomson has 44 bytes of RAM. This should be compared with the 4 million bytes of RAM available in a typical personal computer.

Some algorithms can make use of other types of memory: A typical smart card contains several thousand bytes of ROM and several thousand bytes of EEPROM. ROM is unchangeable, and typically stores the program which controls the operation of the smart card. EEPROM is changeable, but writing into it is about one thousand times slower than writing into RAM and the number of times a bit can be rewritten cannot exceed 10,000. It is thus possible to use EEPROM to store slowly changing data such as cryptographic keys or the details of financial transactions, but not as a RAM substitute for intermediate values in a long computation.

SUMMARY OF THE INVENTION

The present invention relates to a method and apparatus for modifying two of the most popular public key schemes (the Rabin encryption scheme and the Fiat-Shamir identification scheme) in order to make them suitable for smart cards with severely limited RAMs. The modified variants are as secure as the original variants, but they are so space-efficient that even the simplest 36 byte smart card can handle moduli n with thousands of bits without any difficulty.

It is an object of the invention to provide a method and apparatus for a public key scheme for smart cards with severely limited RAM without using dedicated coprocessors.

According to the present invention the novel memory efficient variants of public key encryption and identification schemes for smart card applications can be accomplished using as few as 36 butes of RAM. A new randomized multiplication operation $z'=x*y+r*n$ is used where r is a randomly chosen integer in a suitable range [0,b]. A double convolution process is used to compute $z'$.

DETAILED DESCRIPTION OF THE PREFERRED EMBODIMENTS

Figure 1:
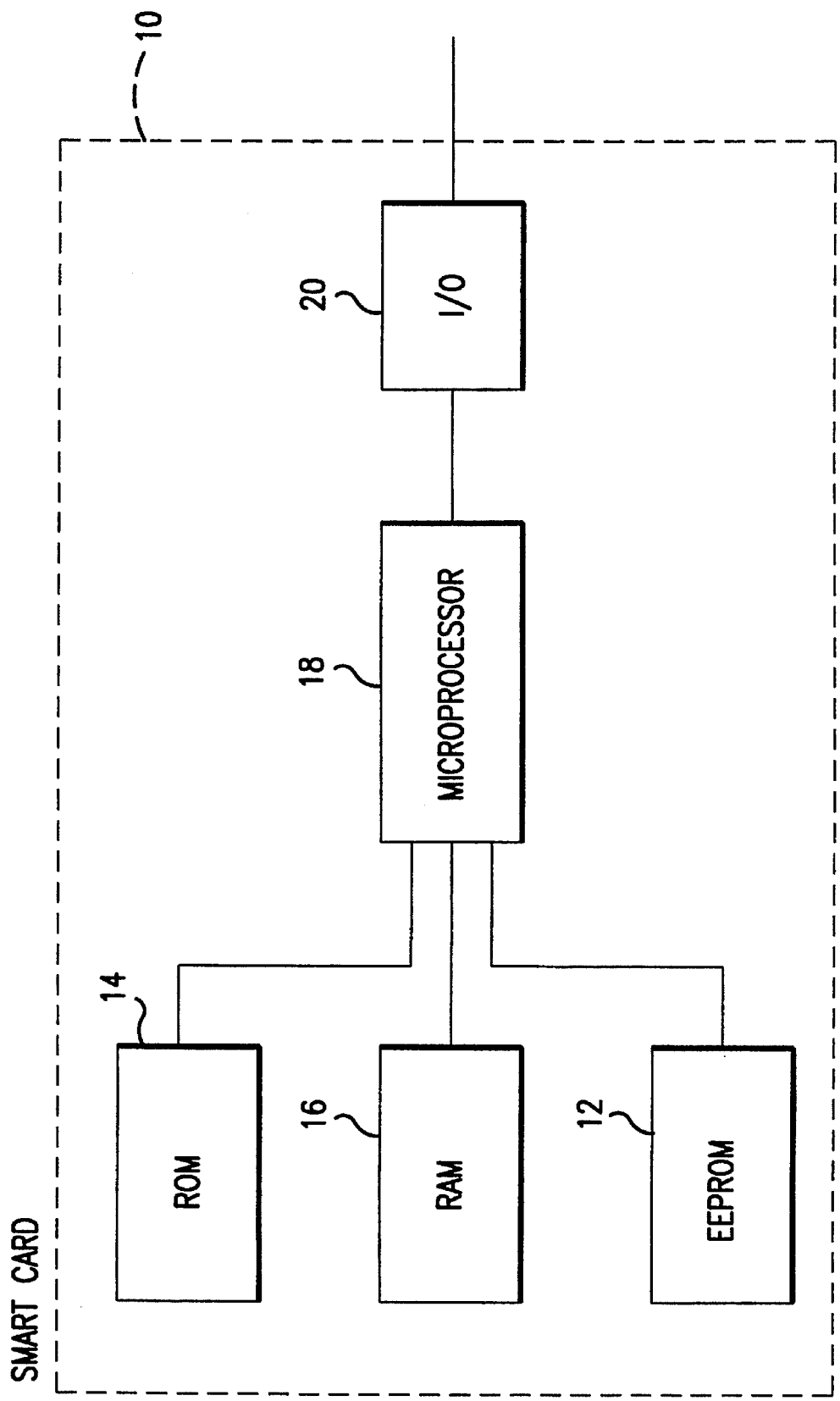
FIG. 1 shows schematically a smart card as used in the invention.

First one considers the basic operation of multiplying two large numbers x and y which are already stored in a smart card 10 (e.g., in its EEPROM 12), see FIG. 1. The successive bytes of x and y are denoted by $x_i$ and $y_i$ (respectively) for i=o, ... ,k–1, where the i-th byte is the least significant one. Smart card 10 has a ROM 14, a RAM 16, a microprocessor chip 18 and the usual I/O 20. The result $z=x*y$ cannot fit in the small RAM, but if it is the final result computed by the smart card, its successive bytes can be sent out (rather than stored) as soon as they are generated.

According to the present invention convolution is used for multiplying two k-byte numbers in $O(k^2)$ time with $O(\log(k))$ workspace. Start with c=0. To compute the i-th byte of the result z for i=0, 1, 2, ... k–1, compute:

$$t = c + \sum_{j=0}^{i} (x_j * y_{i-j})$$

for j=0, 1, 2, ... i, send the least significant byte of t as $z_i$, and use the value of the other bytes of t as the new carry c. Note that for any x and y with up to half a million bits, t fits into 4 bytes, and thus the algorithm can be easily implemented even on the cheapest smart card with 36 bytes of RAM.

Next the problem of computing $z=x*y \pmod{n}$ is considered. By definition, $z=x*y-w*n$ where $w=\lfloor x*y/n \rfloor$ (i.e., w is $x*y/n$ truncated to the largest integer below it). Since z cannot be stored, it is not obvious how to carry out this division operation. One can try to generate the successive bytes of z by the convolution method, but in the division operation one would need these bytes from left to right, whereas the convolution computes them from right to left. Thus one would be forced to recalculate each byte of z a large number of times, and the cryptographic scheme becomes unacceptably slow.

The new solution to this problem according to the invention is to replace the modular multiplication operation $z=x*y-w*n$ where $w=[x*y/n]$ by a new randomized multiplication operation $z'=x*y+r*n$ where r is a randomly chosen integer in a suitable range [0,b]. Such a $z'$ can be easily computed by the following double convolution process:

1. Set c=0.
2. For i=0, 1, ... k–1 compute:

$$t = c + \sum_{j=0}^{i} (x_j * y_{i-j}) + \sum_{m=0}^{i} (r_m * n_{i-m})$$

3. Send the low-order byte of t as $z_i$, and
4. Set c to the number represented by the other bytes of t.

Clearly, the value of z can be recovered from the value of z' by reducing z' modulo n, and thus there is no loss of information in sending z' instead of z. Now it will be shown that when b is a large enough public bound, there is no loss of cryptographic security in sending z' instead of z. Assume that there exists an attack against the cryptographic scheme which uses the knowledge of z'=x*y+r*n for a random r in [0,b]. These values define a probability space P'. We show that such an attack can also be based on the deterministic value of z=x*y−w*n. Given z, the cryptanalyst can easily compute by himself another probability space P" defined by the values z"=z+u*n for a random u in [0,b]. By definition, z"=x*y+(u−w)*n. The only difference between P' and P" is that the range of coefficients of n is shifted by the unknown quantity w from [0,b] to [−w, b−w]. The probability that a random point in one range will fall outside the other is w/b. If x and y are in [0, n], and b is much larger than n, then this probability is negligible (e.g., when b is a power of 2 which is 64 bits longer than n, this probability is less than $2^{-64}$). Since P' and P" are statistically indistinguishable, any cryptanalytic attack will be equally successful over the two probability spaces.

The only disadvantage of randomized multiplication with respect to modular multiplication is that the transmitted result is about twice as long. However, this adds only a negligible communication delay, and the recipient computer (which is usually a powerful PC or a network server) can immediately change z' to z before storing or processing it further.

In the next two sections is described how to use randomized multiplications in order to obtain space-efficient variants of the Rabin and Fiat-Shamir cryptographic schemes.

A Space-Efficient Variant of the Rabin Encryption Scheme

Rabin's public key scheme is used to establish a common secret key K between two parties, which can then be used to encrypt the actual message with a standard cryptosystem such as DES. K is usually the low order bits (56 in the case of DES) of a long number x in the range [0,n] chosen randomly by the sender. However, K can be defined as any other publicly known function of x. The sender then computes and sends z=x*n (mod n), and the recipient uses his knowledge of the factorization of n in order to compute the modular square root of z (mod n). A slight complication is that z yields four possible K's, but this can be solved by known techniques.

Figure 2:
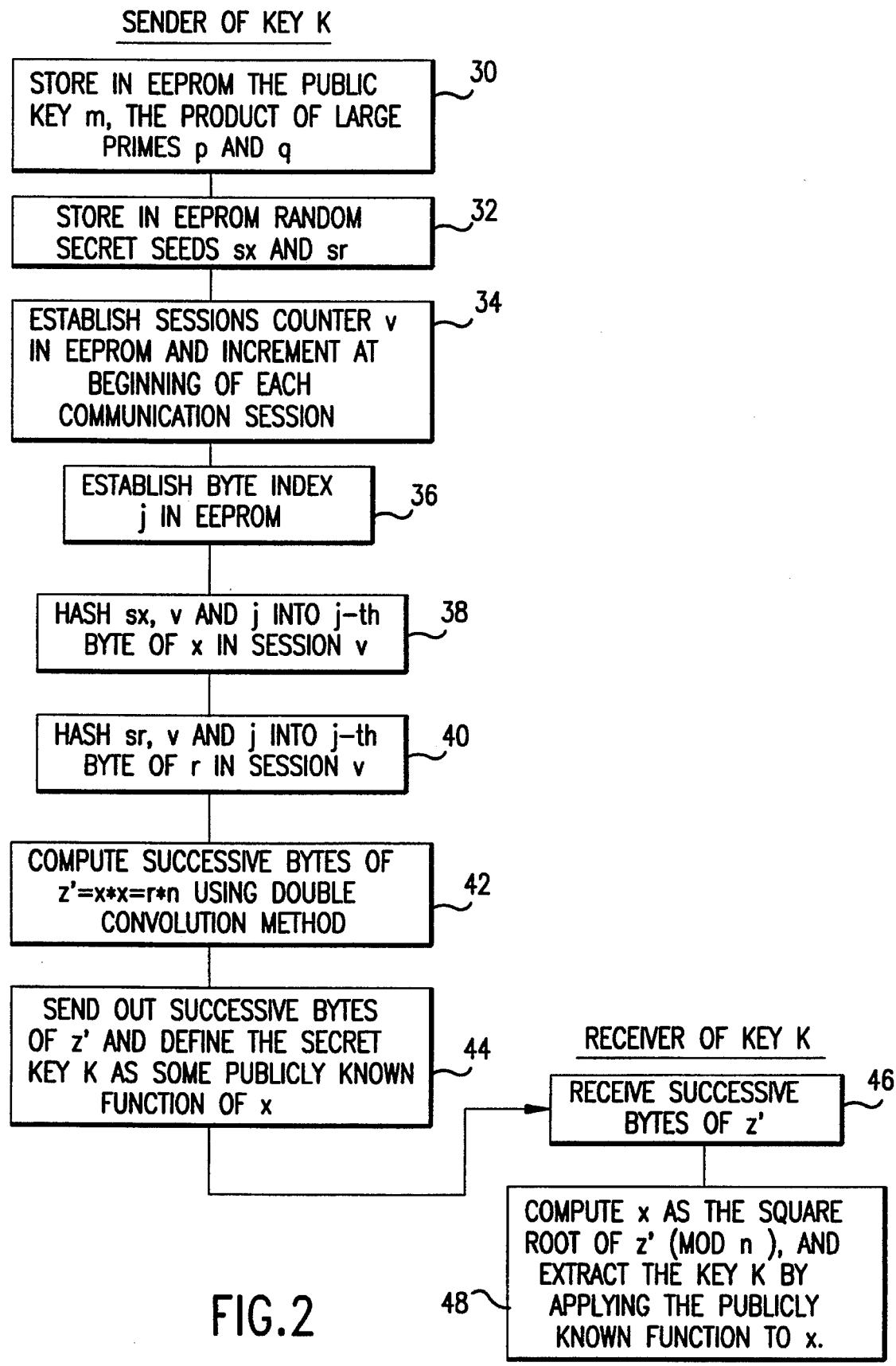
FIG. 2 shows schematically a memory efficient variant of a Rabin scheme as implemented in a smart card according to the invention.

Referring now to FIG. 2 in the proposed new variant, K is sent by computing the randomized multiplication z'=x*x+r*n instead of the modular multiplication z=x*x (mod n). In the preferred implementation of the new variant, n (which is the product of two large primes p and q) is kept in EEPROM, see block 30. It is usually the public key of the organization which issues the cards to its employees and customers, and even small cards with one kilobyte of EEPROM can store an 8000 bit modulus. The numbers x and r are pseudo randomly generated from random secret seeds sx and sr (which are loaded into EEPROM when the card is issued) see block 32, a session counter v (which is incremented in EEPROM at the beginning of each communication session) see block 34, and a byte index j, see block 36. A convenient way of achieving this is to hash sx, v, and j into the j-th byte of x in session v, see block 38, and to hash sr, v, and j into the j-th byte of r in session v, see block 40. In this way it is possible to access individual bytes of x and r in any order without storing x and r anywhere, and thus it is possible for a prover to compute, see block 42, and send out the successive bytes of z', see block 44, by the double convolution method even when n has thousands of bits and the card has only 36 bytes of RAM. The successive bytes are received by a verifier, see block 46 and verification is effected, see block 48.

A Space-Efficient Variant of the Fiat-Shamir Identification Scheme

The Fiat-Shamir identification scheme is described in U.S. Pat. Nos. 4,748,668 and 4,993,970, the disclosures of which are incorporated herein by reference. In this section we describe a novel space-efficient variant of this scheme which makes it possible to implement it on smart cards with very small RAMs.

In the original Fiat-Shamir identification scheme, the smart card (known as the prover) contains in its EEPROM a public modulus n=p*q and a secret number c. The other party (known as the verifier) knows n and d=c*c (mod n). The smart card proves its identity to the verifier by using a zero knowledge protocol to demonstrate its knowledge of c. The proof consists of the following steps:

1. The prover chooses a random number x, and sends z=x*x (mod n) to the verifier.
2. The verifier sends a random bit to the prover.
3. Based on the bit, the prover sends either x or x*c (mod n) to the verifier.
4. Based on the bit, the verifier checks that the square of the received number is either z (mod n) or z*d (mod n).
5. Steps 1–4 are repeated several times to reduce the probability of cheating.

In the new space-efficient variant of the Fiat-Shamir scheme, the prover performs the same steps, but replaces the modular multiplications x*x (mod n) and x*c (mod n) by the randomized multiplications x*x+r*n and x*c+t*n for pseudo-random r and t in [0,b], where b is substantially larger than n (e.g., by at least 64 bits). As demonstrated above, these operations can be carried out with very small RAMs.

Figure 3:
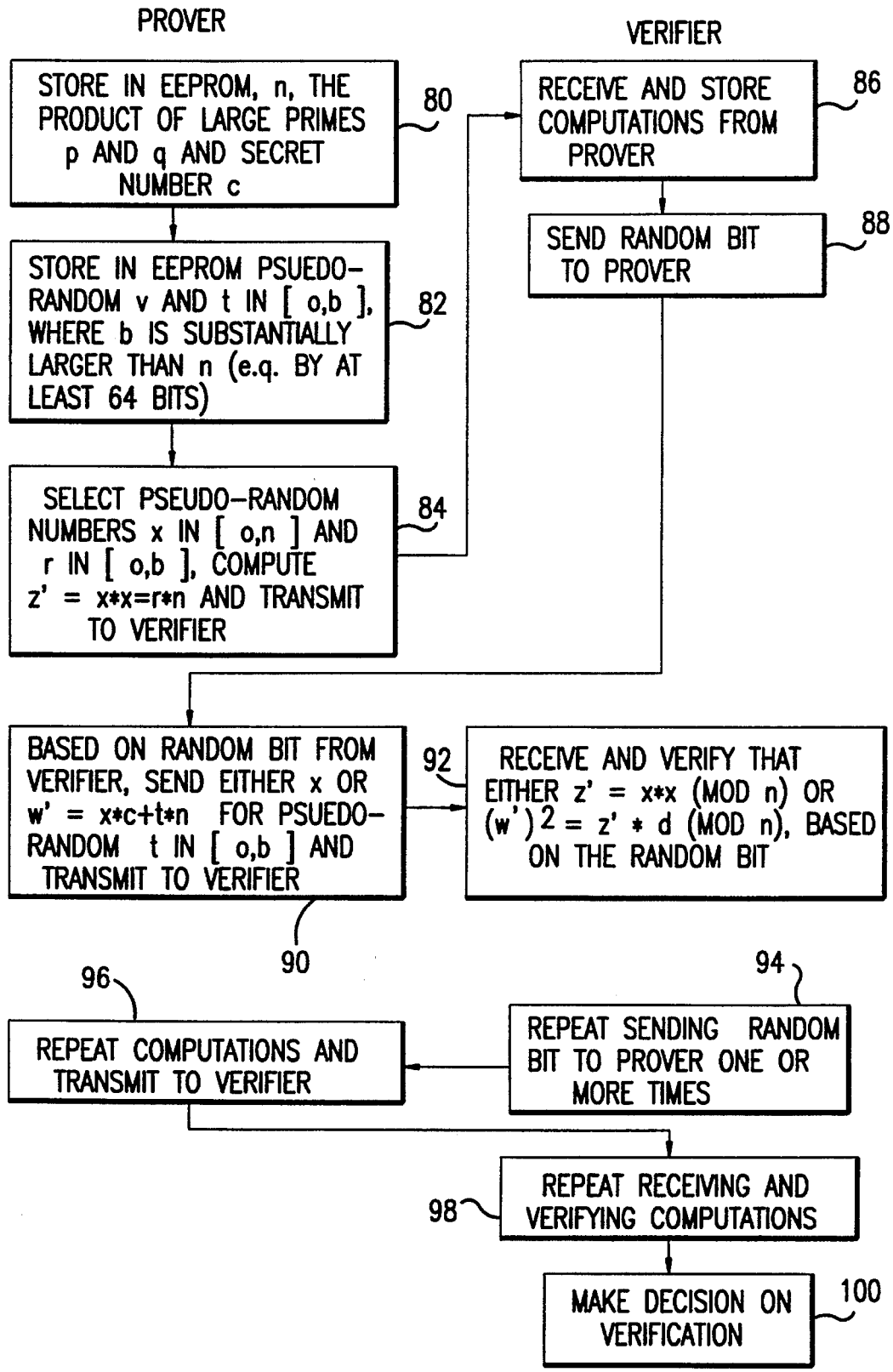
FIG. 3 shows schematically a memory efficient variant of a Fiat-Shamir scheme as implemented in a smart card according to the invention.

Referring to FIG. 3, in block 80, n is stored as the product of large primes p and q, in block 82 pseudo-random v and t are stored, in block 84 the first computation is made and sent to the verifier who receives in block 86 and then sends random bit a number of times for verifying calculations in blocks 88–98. Finally, a verification is made in block 100. The process may be carried out using the double convolution techniques described in the foregoing.

While the invention has been described with respect to certain embodiments thereof, it will be appreciated by one skilled in the art that variations and modifications may be made without departing from the spirit and scope of the invention.

What is claimed is:

1. A method of computing in a space-efficient and cryptographically-secure way a randomized variant of the modular product z=x*y (mod n) comprising the steps of:

(a) storing two k-byte numbers x and y in memory of a smart card including memory, a microprocessor and I/O,
   (b) computing the i-th byte of the result of z'=x*y+r*n where y is a randomly chosen integer in a range [o,b] and n is the product of two large primes p and q, using double convolution by
      (i) starting with c=0

(ii) for i=0, 1, ... k−1, computing $$t = c + \sum_{j=0}^{i} (x_j * y_{i-j}) + \sum_{m=0}^{i} (r_m * n_{i-m})$$

(c) transmitting the low-order byte of t as $z_i$ via the I/O of the smart card, (d) repeating the computation and transmission of steps (b) and (c) using the number represented by the other bytes of t for c.

2. A method of claim 1 including the further steps of:

(e) receiving the transmitted bytes, and (f) recovering the product of the two k-byte numbers x and y (modulo n) from the received bytes.

3. A method of encryption of a secret key K comprising the steps of:

(a) storing a public key n, where n is a product of two large primes p and q, in a EEPROM of a smart card having EEPROM, RAM, a microprocessor and I/O, (b) storing secret seeds sx and sr in the EEPROM, (c) establishing a session counter v and a byte index j in the EEPROM, (d) incrementing the session counter at the beginning of each communications session, (e) hashing sr, v and j and also sx, v and j into the j-th byte of r and x, respectively, in session v, (f) computing successive bytes of z'=x*x+r*n using the method of claim 1, (g) transmitting via the I/O successive bytes of z', (h) defining the secret key K as some publicly known function of x.

4. A method of identification in which an entity claims that it knows a secret value c related to the public values d and n by d=c*c (mod n), and proves it by using the steps of:

(a) storing c and n, wherein n is a product of two large primes p and q, in an EEPROM of a smart card having EEPROM, RAM, a microprocessor and I/O, (b) storing a secret seed sx and sn in the EEPROM, (c) establishing a multiplication counter v and a byte index j in the EEPROM, (d) incrementing the multiplication counter at the beginning of each modular multiplication in each proof of identity, (e) hashing sn, v and j and also sx, v and j into the j-th byte of r and x, respectively, in session v, (f) computing successive bytes of z'=x*x+r*n using the method of claim 1, (g) transmitting via the I/O successive bytes of z', (h) receiving from the verifier a random bit, (i) based on the bit, sending either x or a randomized version of x*c (mod n), according to the method of claim 1, (j) repeating steps (d) to (i) one or more times to reduce the probability of cheating.

5. Apparatus for computing in a space-efficient and cryptographically-secure way a randomized variant of the modular product z=x*y (mod n) comprising:

(a) means for storing two k-byte numbers x and y in memory of a smart card including memory, a microprocessor and I/O, (b) means for computing the i-th byte of the result of z'=x*y+r*n where y is a randomly chosen integer in a range o,b] and n is the product of two large primes p and q, using double convolution by (i) starting with c=0

(ii) for i=0, 1 ... k−1, computing $$t = c + \sum_{j=0}^{i} (x_j * y_{i-j}) + \sum_{m=0}^{i} (r_m * n_{i-m})$$

(c) means for transmitting the low-order byte of t as $z_i$ via the I/O of the smart card, (d) means for repeating the computation and transmission of steps (b) and (c) using the number represented by the other bytes of t for c.

6. Apparatus of claim 5 further comprising:

(e) means for receiving the transmitted bytes, and (f) means for recovering the product of the two k-byte numbers x and y (modulo n) from the received bytes.

7. Apparatus for encryption of a secret key K comprising:

(a) means for storing a public key n wherein n is a product of two large primes p and q, in a EEPROM of a smart card having EEPROM, RAM, a microprocessor and I/O, (b) means for storing secret seeds sx and sr in the EEPROM, (c) means for establishing a session counter v and a byte index j in the EEPROM, (d) means for incrementing the session counter at the beginning of each communications session, (e) means for hashing sr, v and j and also sx, v and j into the j-th byte of r and x, respectively, in session v, (f) means for computing successive bytes of z'=x*x+r*n using the apparatus of claim 5, (g) means for transmitting via the I/O successive bytes of z', (h) means for defining the secret key K as some publicly known function of x.

8. Apparatus for identification in which an entity asserts that it knows a secret value c related to the public values d and n by d=c*c (mod n), and proves it by using apparatus comprising:

(a) means for storing c and n, wherein n is a product of two large primes p and q, in an EEPROM of a smart card having EEPROM, RAM, a microprocessor and I/O, (b) means for storing a secret seed sx and sn in the EEPROM, (c) means for establishing a multiplication counter v and a byte index j in the EEPROM, (d) means for incrementing the multiplication counter at the beginning of each modular multiplication in each proof of identity, (e) means for hashing sn, v and j and also sx, v and j into the j-th byte of r and x, respectively, in session v, (f) means for computing successive bytes of z'=x*x+r*n using the apparatus of claim 5, (g) means for transmitting via the I/O successive bytes of z', (h) means for receiving from the verifier a random bit, (i) means for sending either x or a randomized version of x*c (mod n), based on the bit, using the apparatus of claim 5, and (j) means for repeating steps (d) to (i) one or more times to reduce the probability of cheating.

* * * * *